United States Patent
Sullivan et al.

(10) Patent No.: US 6,738,268 B1
(45) Date of Patent: May 18, 2004

(54) METHOD AND APPARATUS FOR PROVIDING POWER SIGNALS TO OPERATING CIRCUITRY MOUNTED ON CIRCUIT BOARDS

(75) Inventors: David Sullivan, Londonderry, NH (US); Robert MacArthur, Leominster, MA (US)

(73) Assignee: EMC Corporation, Hopkinton, MA (US)

( * ) Notice: Subject to any disclaimer, the term of this patent is extended or adjusted under 35 U.S.C. 154(b) by 238 days.

(21) Appl. No.: 09/995,919

(22) Filed: Nov. 28, 2001

(51) Int. Cl.[7] .............................................. H02M 7/517
(52) U.S. Cl. ............................ 363/49; 363/65; 323/901
(58) Field of Search ............................ 363/49, 50, 65, 363/67, 70, 69, 71; 323/901, 908

(56) References Cited

U.S. PATENT DOCUMENTS 5,267,135 A * 11/1993 Tezuka et al. ................. 363/49
5,612,861 A * 3/1997 Zhong et al. .................. 363/59
6,614,669 B2 * 9/2003 Kuwana et al. ............... 363/49

* cited by examiner

Primary Examiner—Jessica Han
(74) Attorney, Agent, or Firm—Chapin & Huang, L.L.C.; David E. Huang, Esq.

(57) ABSTRACT

A technique involves providing a set of soft start power signals to operating circuitry mounted on a circuit board. In particular, the technique involves enabling (i) a first converter to provide a first soft start power signal to the operating circuitry and (ii) a second converter to provide a second soft start power signal to the operation circuitry. Additionally, the technique involves providing a first control signal that indicates whether the first converter properly provides the first soft start power signal, and providing a second control signal that indicates whether the second converter properly provides the second soft start power signal. Furthermore, the technique involves disabling the first converter if the second control signal indicates that the second converter improperly provides the second soft start power signal, and disabling the second converter if the first control signal indicates that the first converter improperly provides the first soft start power signal.

18 Claims, 9 Drawing Sheets

US 6,738,268 B1

METHOD AND APPARATUS FOR PROVIDING POWER SIGNALS TO OPERATING CIRCUITRY MOUNTED ON CIRCUIT BOARDS

BACKGROUND OF THE INVENTION

In general, a DC/DC converter is an electronic circuit that accepts a DC input (i.e., a power signal) at one voltage level and converts it to a DC output at a lower or higher voltage level. Such a converter is well-suited for circuit boards containing operating circuitry which requires a DC signal having a particular voltage level but that only has access to a different DC signal having a different voltage level. For example, one conventional processor requires both a 3.3 Volt DC signal and a 2.5 Volt DC signal for proper operation. If a processor circuit board manufacturer only has access to a 12 Volt DC signal, the manufacturer can manufacture a processor circuit board having the conventional processor and a set of converters which provides the 3.3 and 2.5 Volt DC signals to the processor in response to the 12 Volt DC signal thus enabling the processor to operate properly.

Some processors require multiple voltages in a particular startup sequence. For example, the above-described conventional processor requires a soft start 3.3 Volt DC signal and a soft start 2.5 Volt DC signal. In accordance with the startup sequence, the 3.3 Volt DC signal and the 2.5 Volt DC signal may never vary from each other by more than 1.2 Volts, and the 2.5 Volt DC signal may never exceed the 3.3 Volt DC signal by more than 0.4 Volts. For such a processor, the circuit board manufacturer typically custom designs external control logic and installs the external control logic between the outputs of the converters (i.e., metal contacts) and the processor. The control logic typically resides on a section of circuit board space that is approximately 2 inches by 2 inches between the converters and the processor, and is configured to electrically isolate the processor from the converter outputs in the event the converters improperly provide the power signals. Accordingly, if the converters provides the power signals out of the particular startup sequence (e.g., if the 3.3 Volt DC signal varies from the 2.5 Volt DC signal by more than 1.2 Volts), the control logic disconnects the processor from the converter outputs to avoid damaging the processor.

Some converters have other special features. For example, one conventional converter includes (i) a sensing contact and (ii) a feedback circuit connected to the sensing contact. A circuit board manufacturer typically connects one end of an external Schottky diode to the converter output, and the other end of the external Schottky diode to the sensing contact. If the output voltage sensed at the sensing contact (i.e., sensed across the Schottky diode) is too high, the feedback circuit directs the converter to provide less current to lower the output voltage. If the output voltage is too low, the feedback circuit directs the converter to provide more current to increase the output voltage.

In some high current demand situations, circuit board manufacturers may install multiple converters that provide the same output voltage. For example, a particular converter may not be able to provide enough current to meet the demands of a particular processor. In such a situation, the manufacturer can install two converters having the above-described feedback capabilities onto a processor circuit board to accommodate the high current demands of the processor. The two converters provide the same output voltage and enough current to satisfy the high current needs of the processor. During periods of operation that requires less current, the feedback circuits of the two converters will sense an increase in the output voltage provided by the converters and direct the converters to provide less current.

As another example of a converter with a special feature, some converters include overvoltage protection circuits. One conventional converter includes (i) a switched-capacitor circuit that provides an output voltage, (ii) a converter output (e.g., a metallic contact) for connecting to external operating circuitry (e.g., a processor), and (iii) an overvoltage protection circuit interconnected between the switched-capacitor circuit and the converter output. The overvoltage protection circuit is configured to disconnect the switched-capacitor circuit from the converter output if the output voltage exceeds a predetermined threshold. Accordingly, when the output voltage of the power signal is excessive, the overvoltage protection circuit prevents the power signal from reaching and possibly damaging the external operating circuitry.

As yet another example, some converters include trim pins which, when soldered to a resistor or a voltage divider that provides a particular voltage, causes the converter to provide an output voltage that is based on the particular voltage. For example, suppose that a circuit board manufacturer (i) requires a 3.0 Volt DC signal and (ii) has both expensive 3.0 Volt converters and less expensive 3.3 Volt converters available. The manufacturer may be able to use the less expensive 3.3 Volt converters by utilizing the trim pin feature of the 3.3 Volt converters. To this end, the manufacturer can solder the trim pin of each 3.3 Volt converter to a resistor providing an appropriate voltage that directs the 3.3 Volt converter to provide the 3.0 Volt DC signal rather than a 3.3 Volt DC signal thus enabling the manufacturer to take advantage of the lower cost 3.3 Volt converters.

SUMMARY OF THE INVENTION

Unfortunately, there are deficiencies to the above-described conventional converter configurations. For example, in the earlier-described conventional converter configurations in which a processor circuit board manufacturer custom designs an external control logic circuit that disconnects the converters from the processor if the converters provide a set of power signals out of a required startup sequence, the manufacturer is burdened with the task of designing a new external control logic circuit for each new combination of converters. That is, the manufacturer requires a first external control logic circuit for a circuit board that uses a 5.0 Volt converter and a 3.3 Volt converter to provide a particular startup sequence, a second external control logic circuit for a circuit board that uses a 3.3 Volt converter and a 2.5 Volt converter to provide a particular startup sequence, and so on. Additionally, each external control logic circuit requires circuit board space (e.g., a 2 inch by 2 inch area), a valuable resource which could otherwise be used for other circuitry. Furthermore, although the external control logic electrically isolates the processor from the converters to avoid damaging the processor, the converters remain in operation thus providing an unsafe situation (e.g., the possibility that the converters or the power supplies could damage themselves, the circuit board, the power supply feeding the converters, etc.).

Additionally, in the earlier-described conventional configurations in which a processor circuit board manufacturer installs multiple converters that provide the same output voltage in high current demand situations, there is no control over how much current each converter provides. Accordingly, for a circuit board that uses two converters to provide the same output voltage to a processor, one converter often provides a large amount of current (e.g., 10 amps or 99% of the current) while the other converter provides substantially less current (e.g., only 100 milliamps or 1% of the current). As such, if the converter that provides the larger amount of current fails, the other converter which provided substantially less current is now forced to immediately provide a significant amount of current which can damage that converter as well as the circuitry connected to that converter (e.g., the converter providing 100 milliamps or 1% of the current may be required to immediately provide more than 10 amps or 100% of the current).

Furthermore, in the earlier-described conventional configurations in which a conventional converter includes an overvoltage protection circuit that disconnects the switched-capacitor circuit from the converter output in response to an overvoltage condition, the switched-capacitor circuit can remain connected to the input feed. Accordingly, in some situations, the switched-capacitor circuit can overcharge beyond its designated voltage to the value of the input voltage, and thus provide an unsafe situation (e.g., that damages the converter components, the circuit board, the power supply feeding the converter, etc.).

Also, in the earlier-described conventional configurations in which a conventional converter includes a trim pin soldered to a resistor or voltage divider to enable the converter to provide an adjusted constant output (e.g., to enable a 3.3 Volt converter to provide a 3.0 Volt DC signal), the configuration does not lend itself well to adjustment. In particular, the configuration does not allow for raising or lowering the output voltage for stress testing. For example, on a circuit board that includes the converter and operating circuitry, there is little or no opportunity to direct the converter to increase the output voltage by 10% or decrease the output voltage by 10% to stress test the circuit board since the trim pin of the converter is soldered to a resistor or a voltage divider.

In contrast to the above-described conventional configurations, embodiments of the invention are directed to techniques for providing a set of power signals to operating circuitry mounted on a circuit board that overcome many or all of the above-described deficiencies.

One embodiment of the invention is directed to a circuit board that includes a section of circuit board material and operating circuitry mounted to the section of circuit board material. The operating circuitry is configured to receive a set of soft start power signals in a particular sequence when transitioning from a startup state to a normal operating state. The circuit board further includes a converter system having a first circuit, a second circuit and an interconnection mechanism. The first circuit includes a first converter that provides a first soft start power signal to the operating circuitry, and a first controller that provides a first control signal indicating whether the first converter properly provides the first soft start power signal. The second circuit includes a second converter that provides a second soft start power signal to the operating circuitry, and a second controller that provides a second control signal indicating whether the second converter properly provides the second soft start power signal. The interconnection mechanism electrically connects the first controller of the first circuit with the second controller of the second circuit. The first controller disables the first converter when the second control signal indicates that the second converter improperly provides the second soft start power signal. Similarly, the second controller disables the second converter when the first control signal indicates that the first converter improperly provides the first soft start power signal. Accordingly, the controllers can disable the converters in the event of improperly providing the power signals. Additionally, when the converters are packaged with the controllers as single devices, no custom-designed external control logic is required to disconnect the operating circuitry from the converters since the internal controllers disable the converters thus saving time and effort that would otherwise be required to design and customize the control logic and thus saving circuit board space that would otherwise be occupied by the external control logic. Furthermore, disabling the converters is safer than the conventional approach of simply disconnecting the operating circuitry from conventional converters which can continue to operate.

In one arrangement, the first controller further provides a first current indication signal which is proportional to a value of current of the first soft start power signal, and the second controller further provides a second current indication signal which is proportional to a value of current of the second soft start power signal. The first controller directs the first converter to provide the first soft start power signal based on the second current indication signal provided by the second controller. Similarly, the second controller directs the second converter to provide the second soft start power signal based on the first current indication signal provided by the first controller. For example, each controller can direct a corresponding converter to provide roughly 50% of the current based on the first and second current indication signals, (e.g., sensing through power MOSFETs). Accordingly, if a converter fails, the remaining converter can compensate by providing 100% of the current rather than roughly 50% of the current. The transition from providing 50% of the current to 100% of the current is less extreme and thus less likely to damage the converter any related circuitry. This is a safer operation than requiring a converter to immediately transition from providing approximately 1% of the current to 100% of the current as in the earlier-described conventional converter configuration.

In one arrangement, the each converter includes (i) switched-capacitor circuitry that electrically connects with a voltage reference and a ground reference in an alternating manner to provide a soft start power signal to the operating circuitry, (ii) an overvoltage protection switch interconnected between the switched capacitor circuitry and the voltage reference, and (iii) a control circuit coupled to the switched capacitor circuitry and the overvoltage protection switch. The soft start power signal has an output voltage value that is between a voltage reference value of the voltage reference and a ground reference value of the ground reference. The control circuit is configured to open the overvoltage protection switch when the output voltage value exceeds a predetermined threshold. Accordingly, the overvoltage protection switch cuts off the switched-capacitor circuitry from the voltage reference in response to an overvoltage condition thus preventing the switched-capacitor circuitry from inadvertently overcharging and otherwise causing damage.

In one arrangement, the first circuit further includes a control register. In this arrangement, the first controller selectively directs the first converter to provide (i) the first soft power signal with a regulated voltage value regardless of a value of an input power signal when the control register stores a first control value, and (ii) the first soft start power signal with a margined voltage value based on the value of the input power signal when the control register stores a second control value that is different than the first control value. Accordingly, the first circuit can be programmed to operate in a normal operating mode (i.e., to provide a regulated power signal) or a test mode (i.e., to provide a margined voltage value) for stress testing the circuit board under extreme power signal conditions.

The features of the invention, as described above, may be employed in computer systems, devices and methods as well as other computer-related components such as those of EMC Corporation of Hopkinton, Mass.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
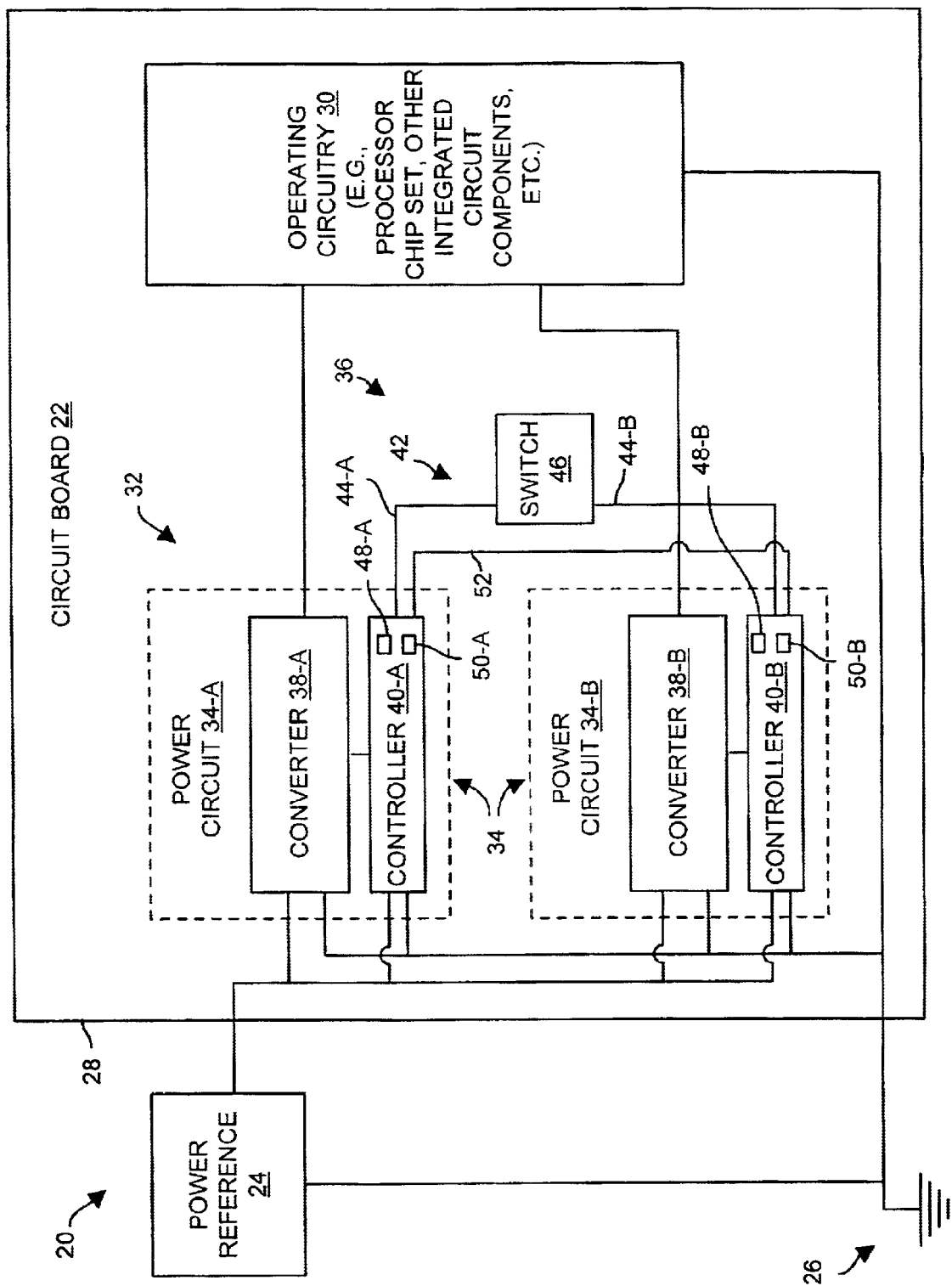
FIG. 1 is a block diagram of a powered circuit board configuration which is suitable for use by the invention.

Embodiments of the invention are directed to techniques for providing a set of power signals to operating circuitry mounted on a circuit board. FIG. 1 shows a powered circuit board configuration 20 which is suitable for use by the invention. The powered circuit board configuration 20 includes a circuit board 22, a power reference 24 (e.g., a power supply), and a ground reference 26.

The circuit board 22 includes a section of circuit board material 28 (e.g., layers of conductive and non-conductive material sandwiched together), operating circuitry 30 (e.g., a set of integrated circuit components, resistors, capacitors, a processor, etc.) and a converter system 32. When the circuit board 22 receives a main power signal from the power reference 24 and the ground reference 26 (e.g., through a backplane having a set of VCC reference contacts and a set of ground reference contacts) the converter system 32 provides a set of power signals to the operating circuitry 30 based on the main power signal. In response, the operating circuitry 30 can perform operations (e.g., operate as a processor board, a memory board, a network interface, etc.).

The converter system 32 includes multiple power circuits 34-A, 34-B and an interconnection mechanism 36. Each power circuit 34-A, 34-B includes a respective converter 38-A, 38-B (hereinafter generally referred to as converters 38) and a respective controller 40-A, 40-B (hereinafter generally referred to as controllers 40). The controllers 40-A is coupled to the converter 38-A, and controls the operation of the converter 38-A. Similarly, the controller 40-B is coupled to the converter 38-B, and controls the operation of the converter 38-B.

It should be understood that the converter system 32 includes two power circuits 34 by way of example only. In other arrangements, the converter system 32 includes a different number of power circuits 34 (e.g., three, four, etc.).

The interconnection mechanism 36 includes a bi-directional conductive pathway 42 that controls the controller 40-A and the controller 40-B together. The conductive pathway 42 includes conductors 44-A, 44-B (e.g., metallic etch) and a switch 46. One end of the conductor 44-A connects with a first output circuit 48-A and a first sensor 50-A of the controller 40-A. Another end of the conductor 44-A connects with the switch 46. Similarly, one end of the conductor 44-B connects with a second output circuit 48-B and a second sensor 50-B of the controller 40-B. Another end of the conductor 44-B connects with the switch 46. In one arrangement, the switch 46 is a removable resistor (e.g., a zero-Ohm resistor).

As will be described in further detail later, in some arrangements, the interconnection mechanism 36 further includes a communications pathway 52 that enables the power circuits 34-A, 34-B to cooperate in a current sharing manner (e.g., so that each power circuit 34-A, 34-B provides approximately 50% of the current). Such arrangements are appropriate for high current demand applications which use multiple power circuits 34 that provide the same power signal. Further details of the invention will now be described with reference to FIGS. 2 and 3.

Figure 2:
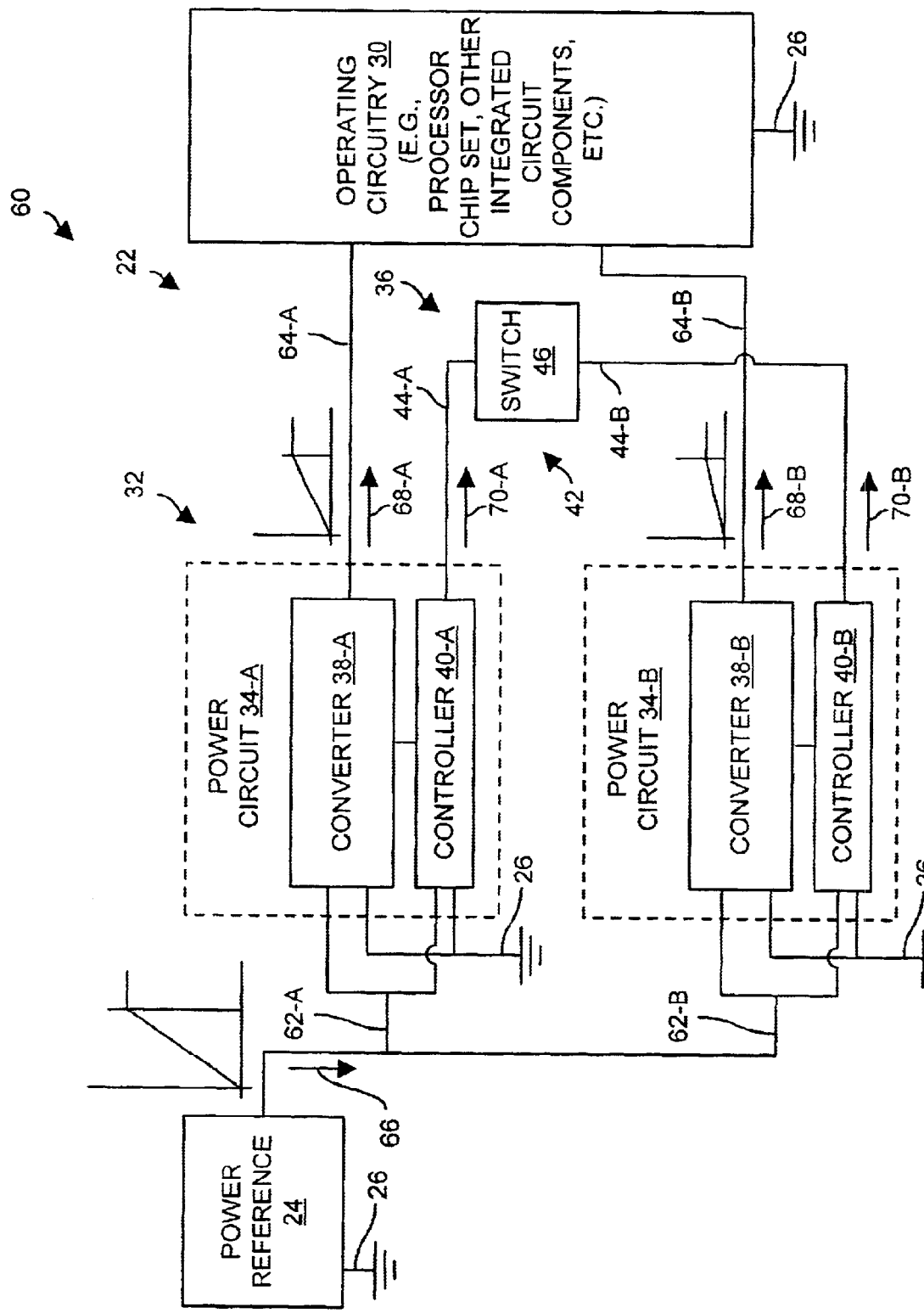
FIG. 2 is a block diagram of a portion of a circuit board of the circuit board configuration of FIG. 1.

FIG. 2 shows a portion 60 of the powered circuit board configuration 20. It should be understood that each controller 40-A, 40-B includes an output circuit 48-A, 48-B and a sensor 50-A, 50-B although these components are omitted from FIG. 2 for simplicity.

As shown in FIG. 2, the power circuit 34-A includes an input 62-A that connects to the power reference 24 and an output 64-A that connects to the operating circuitry 30. Similarly, the power circuit 34-B includes an input 62-B that connects to the power reference 24 and an output 64-B that connects to the operating circuitry 30. The operating circuitry 30 of the circuit board 22 is configured to receive a set of soft start power signals (e.g., a 3.3 Volt DC signal and a 2.5 Volt DC signal) which are different than a main power supply signal 66 (e.g., a 12 Volt DC signal) provided by the power reference 24. The power circuits 34-A, 34-B generate the appropriate soft start power signals from the main power supply signal 66 thus enabling the operating circuitry 30 to operate properly. In particular, the power circuit 34-A is configured to receive the main power signal 66 on the input 62-A, and provide a soft start power signal 68-A on the output 64-B. Additionally, the power circuit 34-B is configured to receive the main power signal 66 on the input 62-B, and provide a soft start power signal 68-B on the output 64-B.

As further shown in FIG. 2, each power circuit 34-A, 34-B is configured to provide a control signal 70-A, 70-B to the bi-directional conductive pathway 42 of the interconnection mechanism 36. In particular, the controller 40-A (also see the output circuit 48-A in FIG. 1) provides a control signal 70-A on the conductive pathway 42 indicating whether the converter 38-A properly provides the soft start power signal 68-A. Similarly, the controller 40-B (also see the output circuit 48-B in FIG. 1) provides a control signal 70-B on the conductive pathway 42 indicating whether the converter 38-B properly provides the soft start power signal 68-B.

During operation, each controller 40-A, 40-B (also see the sensors 50-A, 50-B in FIG. 1) monitors the bi-directional conductive pathway 42 of the interconnection mechanism 36 in order to verify that the converter system 32 properly provides the particular startup sequence to the operating circuitry 30. If the controller 40-A determines that the converter 38-B improperly provides the soft start power signal 68-B based on sensing the bi-directional conductive pathway 42 of the interconnection mechanism 36, the controller 40-A disables the converter 38-A (e.g., turns off the converter 38-A, electrically isolates the converter 38-A from the main power signal 66, etc.) so that the converter 38-A no longer operates and is no longer capable of providing the soft start power signal 68-A. Similarly, if the controller 40-B determines that the converter 38-A improperly provides the soft start power signal 68-A based on sensing the bi-directional conductive pathway 42 of the interconnection mechanism 36, the controller 40-B disables the converter 38-B.

It should be understood that the controller 40-A also monitors itself, i.e., the controller 40-A monitors the operation of the power circuit 34-A, since the output circuit 48-A of the controller 40-A provides the control signal 70-A to the same bi-directional conductive pathway 42. Accordingly, if the converter 38-A improperly provides the soft start signal 68-A, the controller 40-A disables the converter 38-A so that the converter 38-A no longer provides the soft start power signal 68-A. In a similar manner, the controller 40-B also monitors itself. Accordingly, if the converter 38-B improperly provides the soft start power signal 68-B, the controller 40-B disables the converter 38-B so that the converter 38-B no longer provides the soft start power signal 68-B. As a result, the entire converter system 32 becomes disabled if the power circuits 34-A, 34-B improperly provide any of the soft start power signals 68-A, 68-B. The operating circuitry 30 is protected because it will no longer receive any of the soft start power signals 68-A, 68-B. Additionally, in contrast to conventional converter configurations which are simply cutoff from the operating circuitry but continue to operate by providing power signals based on a main power signal, other portions of the circuit board 22 are protected as well. For example, the power circuits 34-A, 34-B (and the section of circuit board material on which the power circuits 34-A, 34-B are mounted) are disabled thus protecting the power circuits 34-A, 34-B (and the power reference 24) from further damage, i.e., the power circuits 34-A, 34-B are prevented from operating in an unsafe manner. In an alternative arrangement, each controller 40-A, 40-B includes an internal circuitry (rather than circuitry for monitoring itself through the conductors 44-A, 44-B) to detect improper operation of the converter 38-A, 38-B under its control.

It should be further understood that the converter system 32 lends itself well to debugging. In particular, if the converter system 32 should disable itself due to a defective power circuit 34-A, 34-B, a technician can disconnect the bi-directional conductive pathway 42 by operating the switch 46 to determine which power circuit 34-A, is operating improperly. That is, by opening the switch 46, the technician can individually sense the control signals 70-A, 70-B on the conductors 44-A, 44-B to identify which power circuit 34-A, 34-B provides a control signal 70-A, 70-B indicating improper operation. In one arrangement, the switch 46 is a removable conductive element such as a low resistance or a zero resistance resistor (e.g., a zero-Ohm resistor). Further details of the invention will now be provided with reference to FIG. 3.

Figure 3:
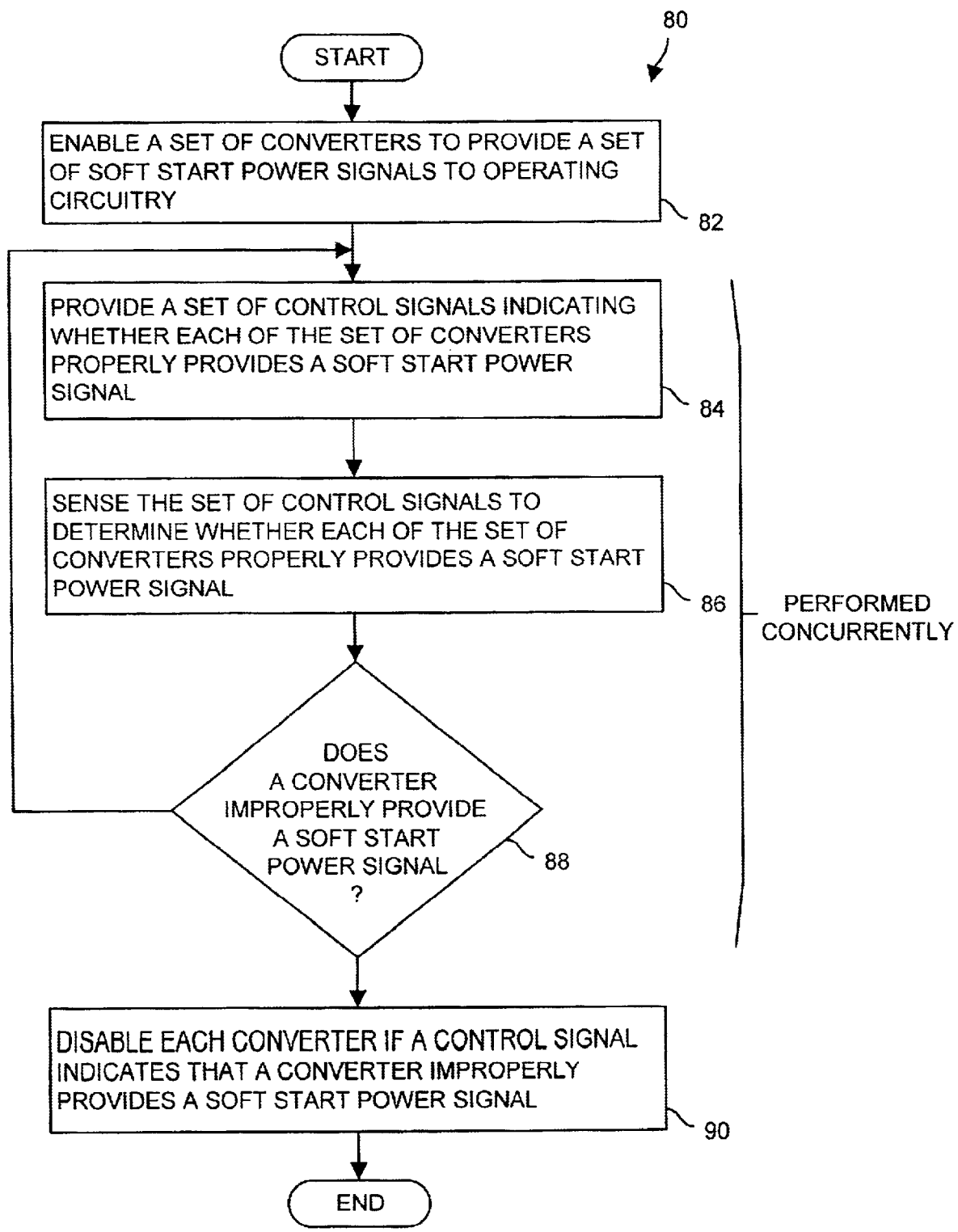
FIG. 3 is a flowchart of a procedure performed by the circuit board portion of FIG. 2.

FIG. 3 shows a procedure 80 which is performed by the controllers 40 of the portion 60 of the powered circuit board configuration 20 during operation. In step 82, the circuit board portion 60 enables the set of converters 38 to provide the set of soft start power signals 68 of the operating circuitry 30. Such enabling occurs upon activation of the power reference 24 (also see FIG. 1), i.e., when the circuit board portion 60 begins to receive an input power signal (e.g., the main power signal 66) from the power reference 24 (e.g., during startup).

In step 84, the controllers 40 provide the set of control signals 70 indicating whether each converter 38 properly provides a respective soft start power signal 68. This operation occurs while the converters 38 continue to provide the soft start power signals 68 after being enabled (i.e., after step 82).

In step 86, the controllers 40 sense the set of control signals 70 to determine whether each of the set of converters 38 properly provides a respective soft start power signal 68. In one arrangement, the controller 40 of each power circuit 34 provides a voltage indicative of the current output voltage of the converter 38 of that power circuit 34. Accordingly, if any of the converters 38 improperly provides a soft start power signal 68, the controller 40 corresponding to that converter 38 provides a control signal 70 indicating such, e.g., a voltage that is different than what would normally be provided if the converter 38 properly provided the soft start signal 68 thus indicating that the converter 38 is improperly providing a soft start signal 68.

In step 88, the controllers 40 determine whether any converters 38 improperly provide a soft start power signal 68. As mentioned earlier, the interconnection mechanism 36 between the power circuits 34 is a bi-directional conductive pathway 42. Accordingly, the controllers 40 can detect a converter 38 improperly providing a soft start power signal 68 by sensing the bi-directional conductive pathway 42. In particular, when a converter 38 improperly provides a soft start power signal 68, the corresponding controller 40 outputs a control signal 70 on the bi-directional conductive pathway 42 that is different than what the controllers 40 except (e.g., an incorrect voltage). As a result, if none of the converters 38 improperly provides a soft start power signal 68, step 88 proceeds back to step 86. Otherwise, if a converter 38 improperly provides a soft start power signal 68, step 88 proceeds to step 90.

In step 90, the controllers 40 disable the converters 38. Such disabling of the converters 38 prevents damage to the operating circuitry 30, the circuit board portion 60 and the power reference 24. Accordingly, the operation of the circuit board portion 60 is safer than that of the earlier-described conventional approach which simply disconnects the operating circuitry from the converters but allows the converters to continue operating.

It should be understood that as long as the converters 38 properly provide the soft start power signals 68, each controller 40 will continue to cycle through steps 84, 86 and 88 concurrently, and thus provide power to the operating circuitry 30 (FIG. 2). It is only when one or more of the converters 38 improperly provides the soft start power signals 68 that the controllers 40 exit the loop of steps 84, 86 and 88 and proceed to step 90 to disable the converters 38 in order to prevent damage all circuitry areas. Further details of the invention will now be provided with reference to FIGS. 4A, 4B and 4C.

Figure 4A:
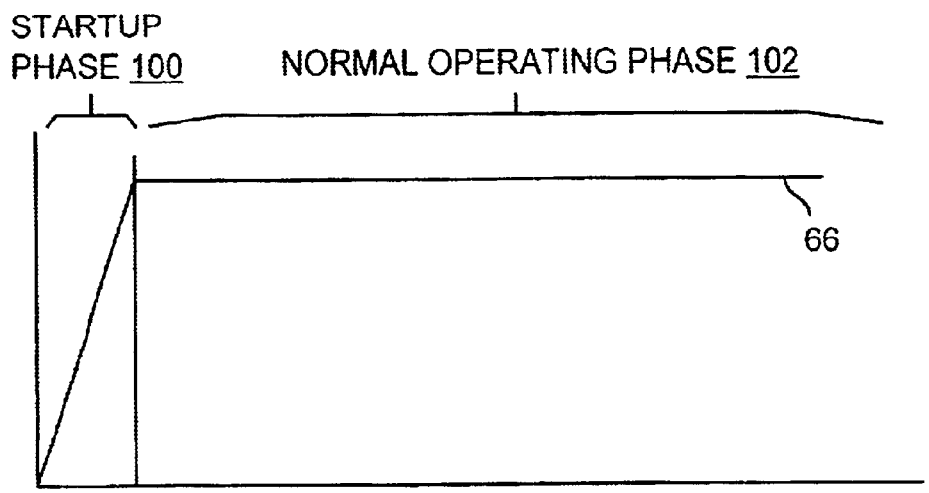
FIG. 4A is a timing diagram of an input power signal received by the circuit board portion of FIG. 2.

FIG. 4A is a timing diagram of the main power signal 66. As shown, the main power signal 66 initially has no value (e.g., zero Volts). Then, during a startup phase 100 (activation of the power reference 24), the main power signal 66 climbs steadily to a nominal value (e.g., 12 Volts DC).

Figure 4B:
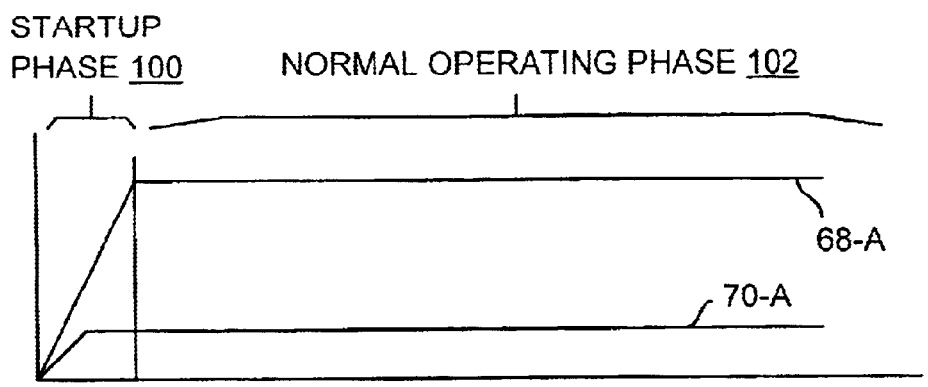
FIG. 4B is a timing diagram of an output power signal provided by the circuit board portion of FIG. 2.

FIG. 4B is a timing diagram of the soft start power signal 68-A provided by the power circuit 34-A in response to the main power signal 66. As shown, the soft start power signal 68-A initially has no value (e.g., zero Volts) at the same time the main power signal 66 has no value (i.e., when the power reference 24 is inactivated). Then, during the startup phase 100 (after activation of the power reference 24), the soft start power signal 68-A climbs steadily to a nominal value (e.g., 3.3 Volts DC). The soft start power signal 68-A reaches its nominal value at approximately the same time that the main power signal 66 reaches the nominal phase 102.

If the converter 38-A properly provides the soft start power signal 68-A, the control signal 70 provided by the controller 40 of the power circuit 34-A climbs in a manner similar to that of the soft start power signal 68-A until it reaches a nominal value, as shown in FIG. 4B. However, if the converter 38-A improperly provides the soft start power signal 68-A, the control signal 70 provided by the controller 40 of the power circuit 34-A does not reach the nominal value and behaves differently, e.g., drops to zero, reaches a value substantially less the nominal value, etc. The converter 34-A can detect the control signal 70-A and disable itself. Additionally, such behavior is detectable by other power circuits 34 (e.g., the power circuit 34-B) through the bi-directional pathway 42 thus enabling the other power circuits 34 to respond by disabling themselves too.

Figure 4C:
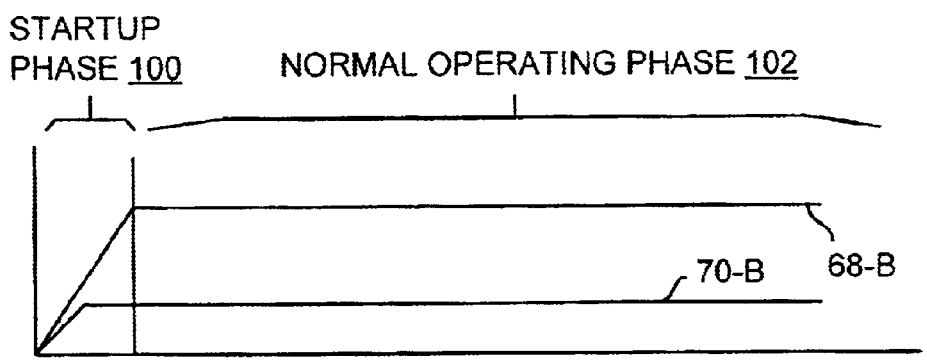
FIG. 4C is a timing diagram of another output power signal provided by the circuit board portion of FIG. 2.

FIG. 4C is a timing diagram of the soft start power signal 68-B provided by the power circuit 34-B in response to the main power signal 66. As shown, the soft start power signal 68-B initially has no value (e.g., zero Volts) at the same time the main power signal 66 has no value (i.e., when the power reference 24 is inactivated). Then, during the startup phase 100 (after activation of the power reference 24), the soft start power signal 68-B climbs steadily to a nominal value. By way of example only, the nominal value of the soft start power signal 68-B (e.g., 2.5 Volts DC) is shown as being less than that of the soft start power signal 68-A of FIG. 4B. Again, the soft start power signal 68-B reaches its nominal value at approximately the same time that the main power signal 66 reaches the nominal phase 102.

It should be understood that, although the nominal value of the soft start power signal 68-B is less than the nominal value of the soft start power signal 68-A, the shapes and nominal values of the control signals 70-A, 70-B are substantially the same when the power circuits 34-A, 34-B operate properly. As a result, the power circuits 34-A, 34-B are compatible with each other even though they are configured to provide different soft start power signals 68-A, 68-B (e.g., different voltages). In this manner, power circuit 34 in general can be connected together through the interconnection mechanism 36 regardless of their particularly configured output values. If any power circuit 34 operates improperly, it can signal the other power circuits 34 by providing an incorrect control signal 70 thus enabling all of the power circuits 34 to detect such improper operation and disable themselves.

It should be further understood that the shapes of the signals 66, 68-A, 68-B were shown as being linear in FIGS. 4A, 4B and 4C during both the startup phase 100 and the normal operating phase 102 by way of example only. In other arrangements, the signals 66, 68-A, 68-B are non-linear. In one arrangement, the signals 66, 68-A, 68-B are DC signals and have curved shapes during the startup phase 100 (e.g., an exponential curve shape). Further details of the invention will now be provided with reference to FIG. 5.

Figure 5:
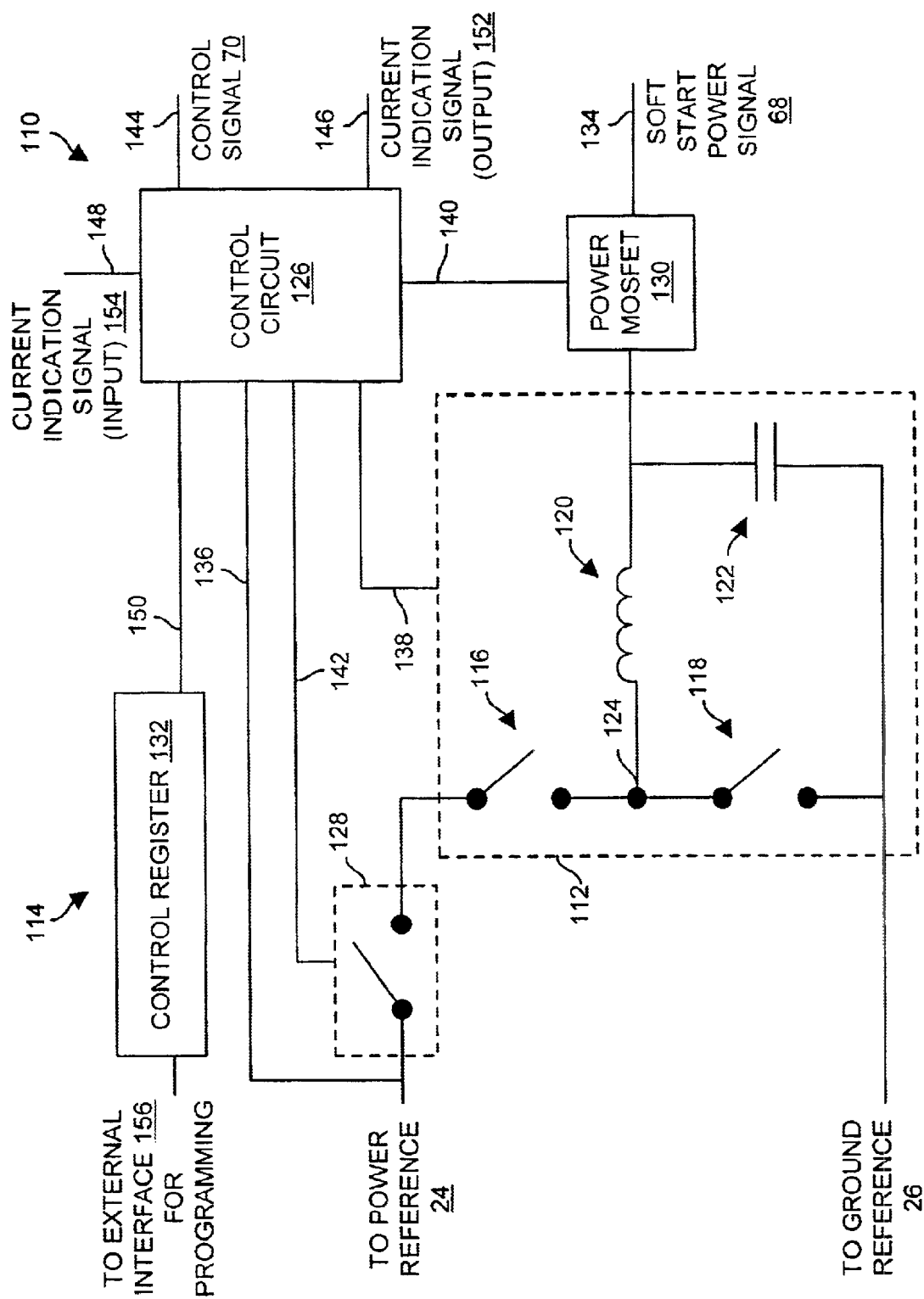
FIG. 5 is a block diagram of a converter of the circuit board portion of FIG. 2.

FIG. 5 shows a block diagram of a power circuit 110 which is suitable for use as any of the power circuits 34 in FIG. 2. The power circuit 110 includes a switched capacitor circuit 112 and additional logic 114 that controls the operation of the switched capacitor circuit 112. The switched capacitor circuit 112 forms a part of a converter 40 (see FIGS. 1 and 2). Some portions of the additional logic 114 forms part of the converter 40, and other portions form part of a controller 40 (again, see FIGS. 1 and 2).

The switched capacitor circuit 112 interconnects between the power reference 24 and the ground reference 26 (also see FIGS. 1 and 2), and includes a set of switches 116, 118, an inductor 120 and a capacitor 122. The switches 116, 188 connect at a node 124, and extend in series between the power and ground references 24, 26. The inductor 120 and the capacitor 122 connect in series between the node 124 and the ground reference 26.

The logic 114 includes a control circuit 126, an overvoltage protection switch 128, a power MOSFET 130 and a control register 132. The overvoltage protection switch 128 interconnects between the power reference 24 and the switched capacitor circuit 112, and is capable of disconnecting the switched capacitor circuit 112 from the power reference 24. The power MOSFET 130 interconnects between the switched capacitor circuit 112 and an output 134 that provides the soft start power signal 68 (also see FIGS. 1 and 2). The control circuit 126 includes an input 136 that connects to the power reference 24, an output 138 that connects to the switched capacitor circuit 112, an input 140 that connects to the power MOSFET 130, an output 142 that connects to the overvoltage protection switch 128, an output 144 that provides the control signal 70 (also see FIGS. 1 and 2), a current indication signal output 146, a current indication signal input 148 and an input 150 that connects to the control register 132.

During operation (e.g., in response to the main power signal 66 on the input 136 from the power reference 24, also see FIG. 2), the control circuit 126 (i) closes the overvoltage protection switch 128 through the output 136 and (ii) operates the switches 116, 118 of the switched capacitor circuit 112 through the output 138 so that the switched capacitor circuit 112 provides the soft start power signal 68 through the power MOSFET 130. Accordingly, the switches 116, 118 open and close in an alternating manner to charge and discharge the capacitor 122. In particular, during a first time period, the switch 116 closes and the switch 118 opens to charge the capacitor 122. During a second time period, the switch 116 opens and the switch 118 closes to discharge the capacitor 122. It should be understood that the capacitor 122 is also capable of discharging through the power MOSFET 130.

Additionally, during operation, the control circuit 126 senses the soft start power signal 68 through the input 140 which connects to the power MOSFET 130. The use of the power MOSFET 130 alleviates the need for an external Schottky diode which is typically used with conventional converters, thus saving circuit board area. If the soft start power signal 68 is provided properly as described earlier in connection with FIGS. 4A, 4B and 4C, the control circuit 126 provides the control signal 70 through the output 144 indicating the proper operation (also see the output circuits 50 of the controllers 40 in FIG. 1). However, if the soft start power signal 68 is provided improperly, the control circuit 126 provides the control signal 70 such that it indicates improper operation and disables the switched capacitor circuit 112.

For example, suppose that the control circuit 126 detects an overvoltage condition at the output of the switched capacitor circuit 112. In particular, suppose that the converter is configured to provide 3.3 Volts DC but the control circuit 126 detects an output that exceeds 3.6 Volts DC (a +10% threshold) due to the switch 116 being stuck in the closed (on) position and the switch 118 being stuck in the open (off) position. The control circuit 126 is configured to respond to the detected overvoltage condition by opening the overvoltage protection switch 128 through the output 136 thus disconnecting the switched capacitor circuit 112 from the power reference 24. Additionally, upon detection of the improper soft start power signal 68, the control circuit 126 outputs a control signal 70 indicating the improper operation. In response, all of the power circuits 110 become disabled (also see the sensors 48 in FIG. 1). Accordingly, the power circuits 110 are disabled and prevented from damaging the operating circuitry 30 (FIGS. 1 and 2) as well as further damaging themselves. This fault tolerance operation is superior to the earlier-described conventional approach of simply disconnecting the conventional converter from the operating circuitry since the conventional converter remains in operation which can result in further damage to the conventional converter, the power supply and other circuits. Moreover, there is no need for external control logic to ensure that the power circuits 110 provide the proper startup sequence; if the sequence is improper, the built-in control circuit 126 of each power circuit 110 can detect such improper operation by sensing the control signals 70 and then disable themselves.

As further shown in FIG. 5, during normal operation, the control circuit 126 provides a current indication signal 152 on the current indication signal output 146 to the communications pathway 52 of the interconnection mechanism 36, and receives current indication signals 154 on the current indication signal input 146 from the communications pathway 52 from other converters (also see FIG. 1). In this way, the power circuit 110 can communicate with other power circuits 110 in a current sharing manner. That is, the power circuit 110 can work with another power circuit 110 so that each power circuit 110 provides approximately 50% of the current to the operating circuitry 30. Accordingly, if one of the power circuits 110 should fail, the other power circuit 110 can quickly provide 100% of the current. This jump from providing 50% to 100% is less severe than the conventional approach in which it is possible to have a first converter providing 99% of the current and a second converter providing 1% since a failure of the converter providing 99% of the current would result in the converter providing 1% of the current to suddenly provide 100%.

In one arrangement, the current indication signal output 146 and the current indication signal input 148 connect to a single bi-directional line (see the communications pathway 52 of the interconnection mechanism 36 in FIG. 1). Accordingly, the control circuit 126 senses both the results of other power circuits 110 plus the results of its own operation.

It should be further understood that the control circuit 126 can be programmed to operate in a variety of modes. In particular, a user can store different values in the control register 132, e.g., through an external interface 156. The control circuit 126 reads the contents of the control register 132 through the input 150. A first value (e.g., a set control bit) in the control register 132 directs the control circuit 126 to operate the power circuit 110 in a normal mode by providing a constant soft start power signal 68 at a constant pre-established value (e.g., 3.3 Volts DC) when the power circuit 110 reaches the normal operation phase 102 (see FIGS. 4A, 4B and 4C). A second value (e.g., a cleared control bit) in the control register 132 directs the control circuit 126 to operate in a margin mode rather than the normal mode. In the margin mode, the control circuit 126 senses the value of the main power supply signal 66 (e.g., 12 Volts DC) from the power reference 24 (see the input 136 in FIG. 5), and adjusts the operation of the switched capacitor circuit 112 to vary the soft start power signal 68 according to the delta (i.e., difference) between the actual value of the main power supply signal 66 and an expected nominal value.

For example, if the main power supply signal 66 is raised 5% higher than its nominal value (e.g., from 12 Volts DC to 12.6 Volts DC), the control circuit 126 raises the soft start power signal 68 by 5% from its pre-established value (e.g., from 3.3 Volts DC to 3.47 Volts DC). If the main power supply signal 66 is then raised 10% higher than its nominal value (e.g., to 13.2 Volts DC), the control circuit 126 raises the soft start power signal 68 by 10% from its pre-established value (e.g., to 3.63 Volts DC). Similarly, if the main power supply signal 66 is lowered to 10% below its nominal value (e.g., 10.8 Volts DC), the control circuit 126 lowers the soft start power signal 68 to 10% below its pre-established value (e.g., to 2.97 Volts DC).

The above-described margining feature enables users (e.g., technicians) to margin test the power circuit 110 as well as the operating circuitry 30 connected to the converter 110. For instance, when the power circuits 110 are installed on the circuit board 22 of FIG. 1, a user can vary the main power supply signal 66 provided by the power reference 24 to cause margining of the soft start power signals 68 provided by the power circuits 110 to margin test (i.e., stress test) the circuit board 22. This feature provides flexibility and robustness that is lacking in the earlier-described conventional approach of soldering converter trim pins to particular voltage lines in order to permanently program a converter to provide a different voltage than that for which it was initially configured because the values of the soft start power signals 68 can be adjusted after installation of the power circuits 110 onto circuit boards 22. Further explanations of the above-described current sharing, overvoltage protection and margin testing features will now be provided with reference to FIGS. 6 through 9.

Figure 6:
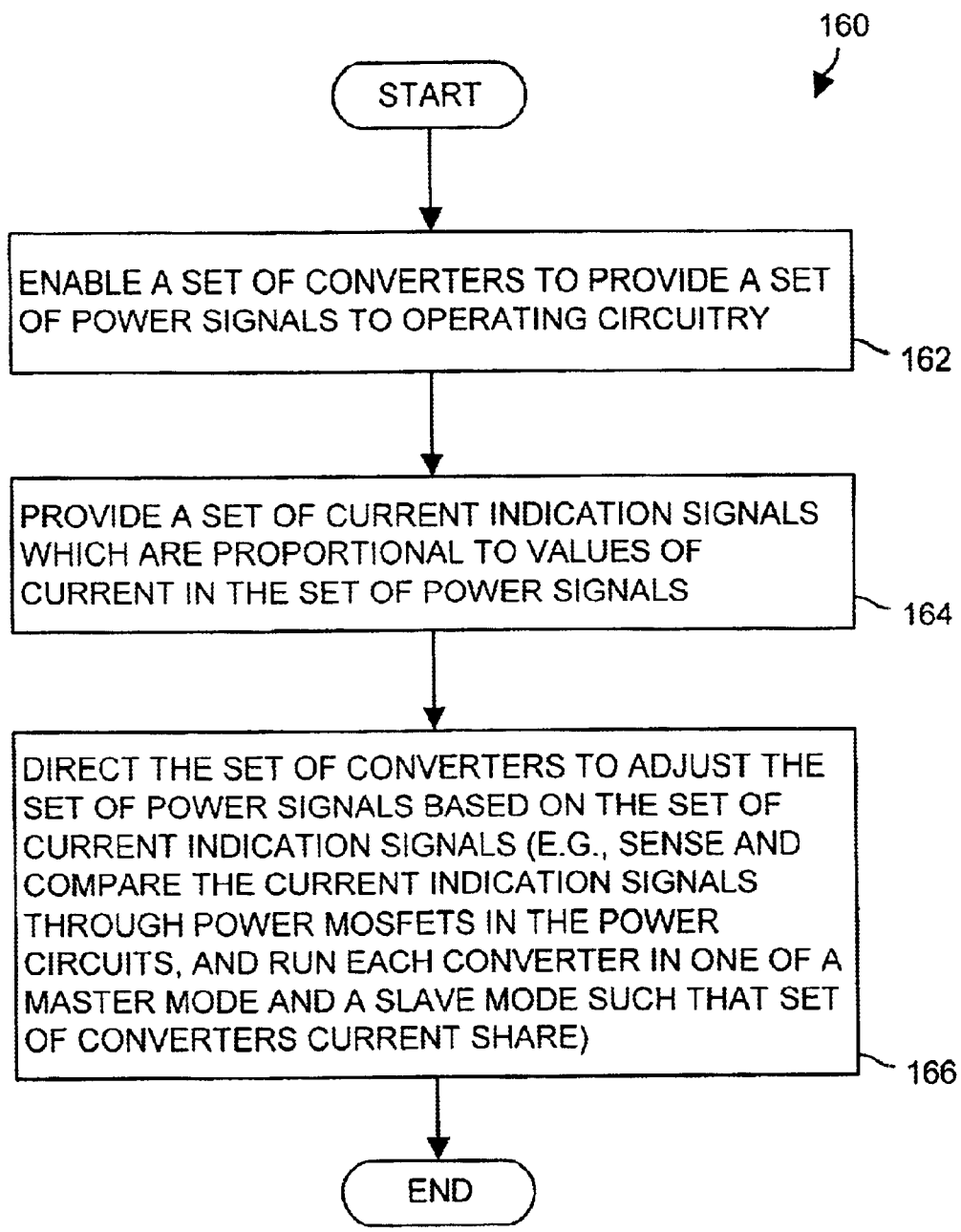
FIG. 6 is a flowchart of another procedure performed by the circuit board portion of FIG. 2.

FIG. 6 shows a flowchart of a procedure 160 performed by the power circuits 34, 110 when operating in a current sharing manner. In step 162, the controllers 40 enable the converters 38 to provide the set of soft start power signals 68 to the operating circuitry 30 (also see the control circuit 126 and the switched capacitor circuit 112 of FIG. 5).

In step 164, the controllers 40 provide a set of current indication signals (e.g., voltages) which are proportional to the values of current in the soft start power signals 68 (see the current indication signal 152 in FIG. 5).

In step 166, the controllers 40 direct the converters 38 to adjust the soft start power signals 68 based on the current indication signals. In particular, the controllers 40 sense and compare the current indication signals through the communications pathway 52 (see FIG. 1) and operate the converters 38 in one of a master mode and a slave mode such that each converter 38 approximately equally shares in the work of providing current to the operating circuitry 30. Accordingly, multiple power circuits 34 can be combined to current share in high current demand applications. Such combinations result in the power circuits 34 approximately performing an equal share of the current load (e.g., each providing roughly 50% of the current when two power circuits 34 are involved, roughly 33% of the current when three power circuits 34 are involved, and so on).

Figure 7:
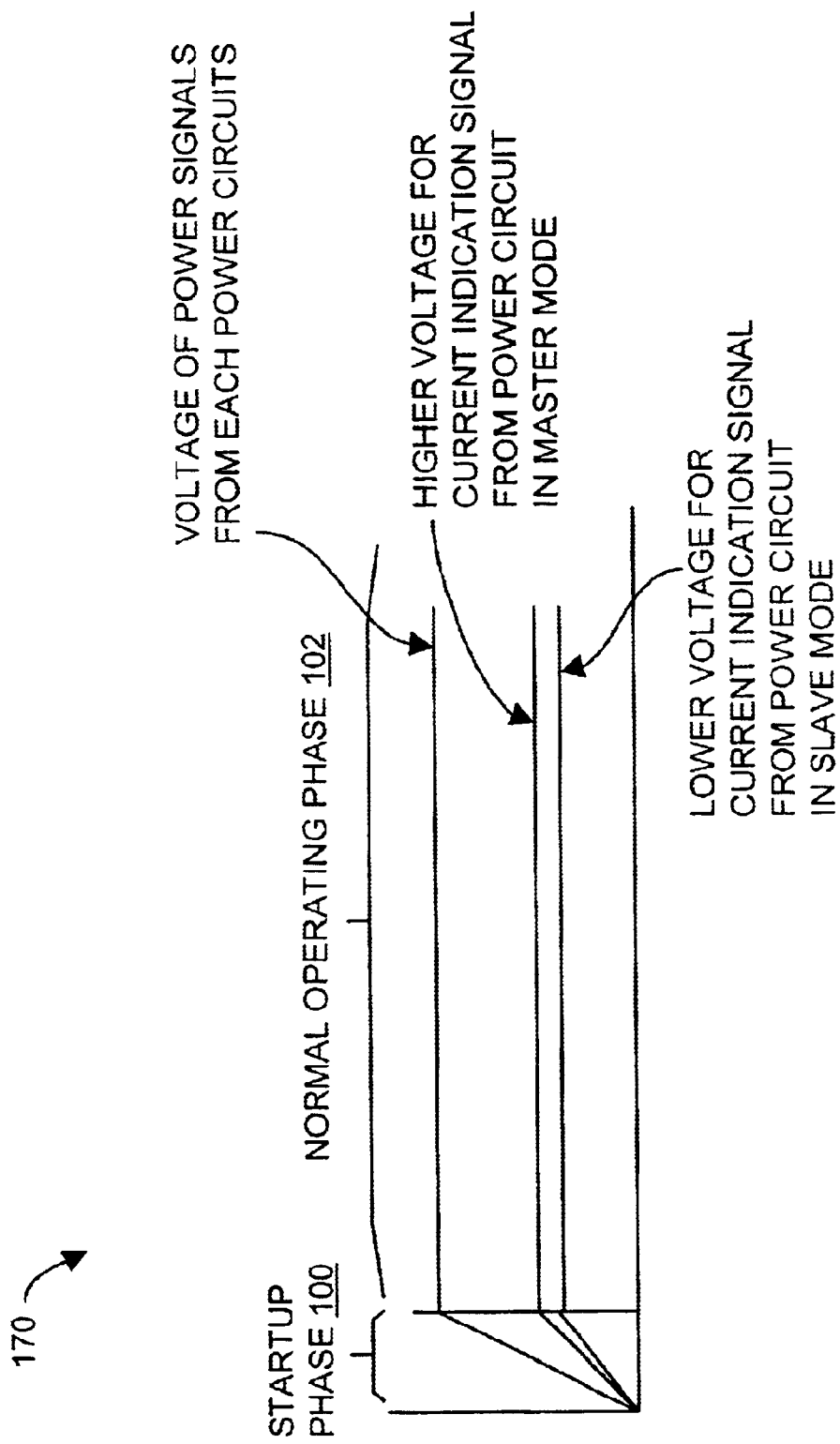
FIG. 7 is a timing diagram of current indication signals provided by the circuit board portion of FIG. 2.

FIG. 7 shows a timing diagram of two power circuits 34, 110 operating together in a current sharing manner. Initially, neither power circuits 34, 110 is programmed to operate in a master mode or slave mode. During the startup phase 100, one of the power circuits 34, 110 arbitrarily takes the lead and provides more current than the other. During the normal operating phase 102, the power circuit 34, 110 in the lead switches to a master mode and provides a slightly higher voltage as its current indication signal 70, and the power circuit 34, 110 that is not in the lead switches to a slave mode and provides a slightly lower voltage as its current indication signal 70. Subsequently, each power circuit 34, 110 current shares and monitors the power circuit's current indication signal 70 in order to step in if the other power circuit 34 should fail. Further details of the invention will now be provided with reference to FIG. 8.

Figure 8:
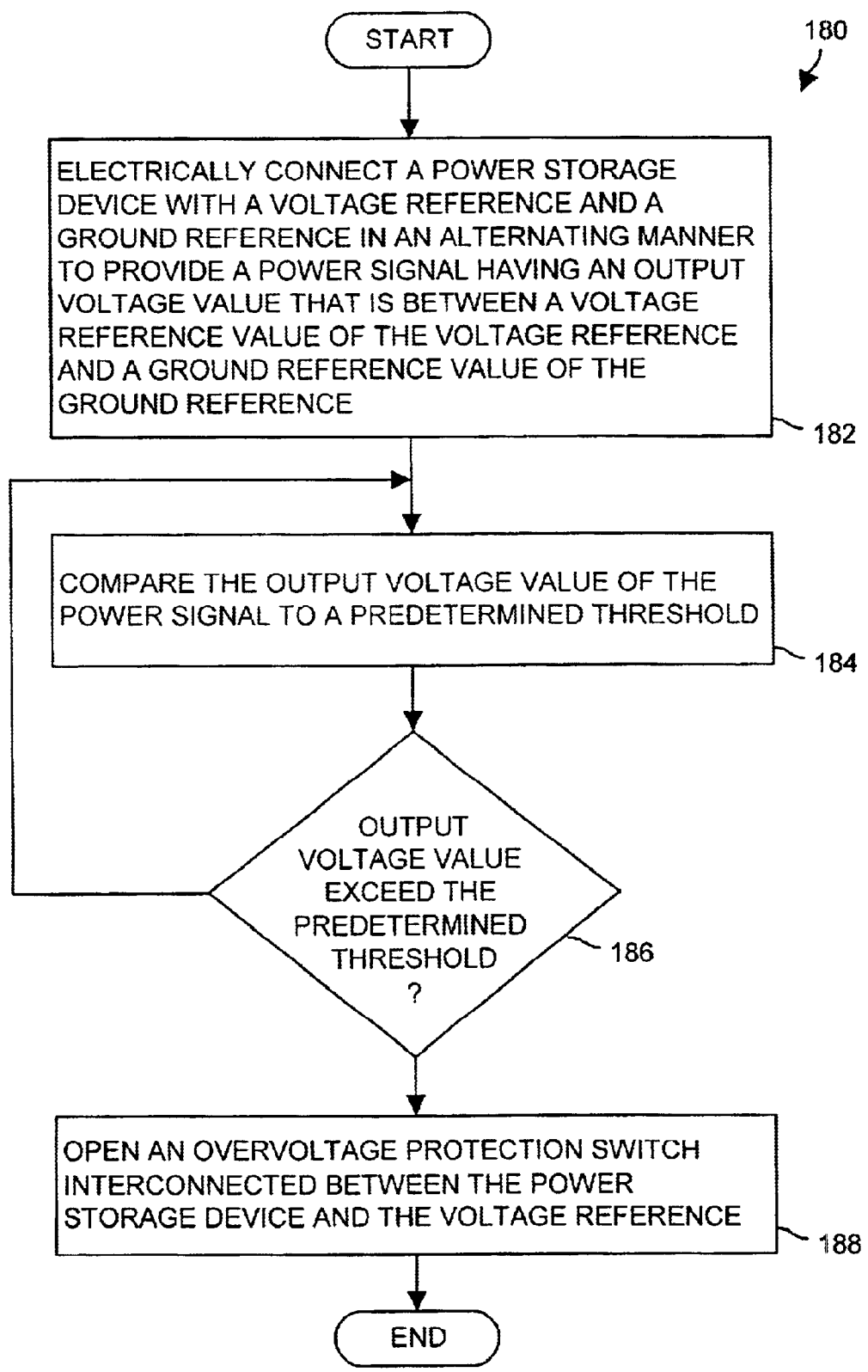
FIG. 8 is a flowchart of a procedure performed by each converter of the circuit board portion of FIG. 2.

FIG. 8 shows a procedure 180 performed by each power circuit 34, 110 in order to provide overvoltage protection. In step 182, the controller 40 electrically connects a power storage device (also see the capacitor 122 of the switched capacitor circuit 112 of FIG. 5) with a voltage reference (see the power reference 24) in an alternating manner to provide a power signal having an output voltage value that is between a voltage reference value of the voltage reference (e.g., 12 Volts DC) and a ground reference value of the ground reference (e.g., zero Volts DC). In particular, the control circuit 126 of FIG. 5 operates the switched capacitor circuit 112 to provide the soft start power signal 70.

In step 184, the control circuit 126 (FIG. 5) compares the output voltage value of the power signal to a predetermined threshold (e.g., 10% greater than 3.3 Volts DC if the power circuit 110 is configured to provide 3.3 Volts DC).

In step 186, the control circuit 126 proceeds back to step 184 when the value of the soft start power signal 70 remains below the predetermined threshold. In this situation, no overvoltage condition exists, and the power circuit 110 provides the soft start power signal 70 to the operating circuitry 30 so that the operating circuitry 30 (e.g., a processor) can operate. However, the controller proceeds to step 188 when the value of the soft start power signal 70 is higher than the predetermined threshold.

In step 188, the control circuit 126 opens an overvoltage protection switch which is interconnected between the power storage device and the voltage reference. In particular and as shown in FIG. 5, the control circuit 126 opens the overvoltage protection switch 128 to disable the switched capacitor circuit 112. Accordingly, the operating circuitry 30 no longer receives the soft start power signal 70 and the power circuit 34 is effectively disabled. Such diagrams avoids further damage to components such as the operating circuitry 30, the power circuit 34 and the power reference 24 (see FIG. 5).

Figure 9:
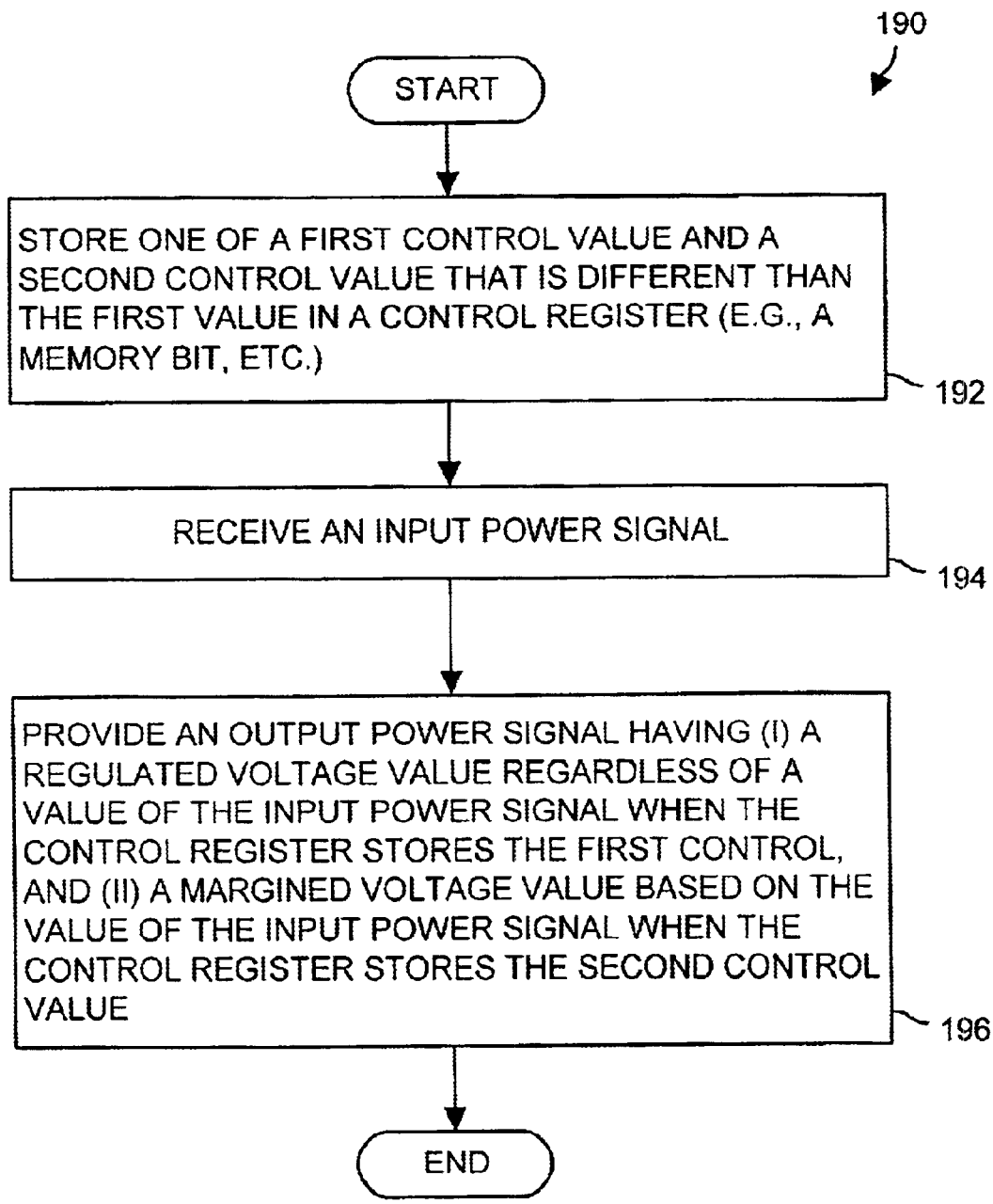
FIG. 9 is a flowchart of another procedure performed by each converter of the circuit board portion of FIG. 2.

FIG. 9 shows a procedure 190 which is performed by the power circuit 110 in order to selectively operate in one of a normal mode and a margin testing mode. In step 192, the control register 132 (see FIG. 5) stores one of a first control value and a second control value that is different than the first control value (e.g., a user sets or clears a particular bit).

In step 194, the power circuit 110 receives an input power signal. In particular, the power circuit 110 receives the main power signal 66 from the power reference 24.

In step 196, the power circuit 110 provides an output power signal having (i) a regulated voltage value regardless of a value of the input power signal when the control register 132 stores the first control value, and (ii) a margined voltage value based on the value of the input power signal when the control register 132 stores the second control value. That is, when the control register 132 stores the first control value, the power circuit 110 simply provides the soft start power signal 68 with a nominal value (e.g., 3.3 Volts DC) regardless of the value of the main power signal 66 (e.g., the main power signal can be 12 Volts DC, 12.2 Volts DC, 11.8 Volt DC, etc.). However, when the control register stores the second control value, the power circuit 110 margins the soft start power signal 68 to a margined value (e.g., lower the 3.3 Volt DC signal by 10% when the main power signal 66 is 10% below nominal, raises the 3.3 Volt DC signal by 10% when the main power signal 66 is 10% higher than nominal, etc.).

As described above, embodiments of the invention are directed to techniques for providing a set of power signals 68 to operating circuitry 30 mounted on a circuit board 22. The power circuits 34 which are used to provide such power signals 68 can form a family of power circuits 34 which can be easily mixed and matched depending on the signal requirements of a particular application. Each of the power circuits 34 of the family are compatible with each other thus alleviating the need to design and create custom external logic circuits that demand both engineering resources as well as additional circuit board area. Rather, power circuits 34 which are configured to provide the same voltage can be combined to current share, power circuit 34 which are configured to provide different voltages can be combined to provide particular startup sequences, etc. without the need for custom circuitry (i.e., the use of such "built-in" logic save further design time and circuit board space). Moreover, such power circuits 34 have improved overvoltage protection features and margining features for robust operation. The features of the invention, as described above, may be employed in electronic systems, circuit boards and procedures as well as other electronic devices such as those of EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the above-described configurations included two power circuits 34 together by way of example only. In some arrangements, the configurations use a different number of power circuits 34. In such arrangements, the interconnection mechanism 36 (see FIG. 1) can be extended to reach all of the power circuit 34 (e.g., in a daisy chain manner). For instance, a configuration can include two power circuits 34 to provide 3.3 Volts DC signal in a current sharing manner, and a third power circuit 34 to provide 2.5 Volts DC signal in a particular startup sequence relative to the 3.3 Volt DC signal.

Additionally, it should be understood that the power reference 24 was described above as a 12 Volt DC power supply and the power circuits 34, 110 were described as nominally providing 3.3 Volts DC and 2.5 Volts DC by way of example only. In other arrangements, other values are used. For example, in some arrangements, the power circuits 34 are available in a converter family that provides 3.3 Volts DC, 2.5 Volts DC, 2.0 Volts DC, 1.8 Volts DC and 1.5 Volts DC. Other values are suitable for use as well.

What is claimed is:

1. A circuit board, comprising:
   (a) a section of circuit board material;
   (b) operating circuitry mounted to the section of circuit board material, the operating circuitry being configured to receive a set of soft start power signals in a particular sequence when transitioning from a startup state to a normal operating state; and
   (c) a converter system that includes:
      (i) a first circuit having:
         (A) a first converter that is configured to provide a first soft start power signal to the operating circuitry, and
         (B) a first controller, coupled to the first converter, that is configured to provide a first control signal indicating whether the first converter properly provides the first soft start power signal;
      (ii) a second circuit having:
         (A) a second converter that is configured to provide a second soft start power signal to the operating circuitry, and
         (B) a second controller, coupled to the second converter, that is configured to provide a second control signal indicating whether the second converter properly provides the second soft start power signal; and
      (iii) an interconnection mechanism which is configured to electrically connect the first controller of the first circuit with the second controller of the second circuit, wherein the first controller is configured to disable the first converter when the second control signal indicates the second converter improperly provides the second soft start power signal, and wherein the second controller is configured to disable the second converter when the first control signal indicates that the first converter improperly provides the first soft start power signal.

2. The circuit board of claim 1 wherein the interconnection mechanism of the converter system is a conductive pathway, wherein the first controller includes (i) a first output circuit that electrically connects with the conductive pathway to provide the first control signal on the conductive pathway and (ii) a first sensor that electrically connects with the conductive pathway, and wherein the second controller includes (i) a second output circuit that electrically connects with the conductive pathway to provide the second control signal on the conductive pathway and (ii) a second sensor that electrically connects with the conductive pathway.

3. The circuit board of claim 2 wherein the conductive pathway of the interconnection mechanism includes:
   a switch;
   a first conductor having a first end that electrically connects with the first output circuit and the first sensor, and a second end that electrically connects with the switch; and
   a second conductor having a first end that electrically connects with the second output circuit and the second sensor, and a second end that electrically connects with the switch.

4. The circuit board of claim 1 wherein the first controller is further configured to provide a first current indication signal which is proportional to a value of current of the first soft start power signal; wherein the second controller is further configured to provide a second current indication signal which is proportional to a value of current of the second soft start power signal; wherein the first controller is configured to direct the first converter to provide the first soft start power signal based on the second current indication signal provided by the second controller; and wherein the second controller is configured to direct the second converter to provide the second soft start power signal based on the first current indication signal provided by the first controller.

5. The circuit board of claim 1 wherein the first converter includes:
   (i) first switched capacitor circuitry that electrically connects with a voltage reference and a ground reference in an alternating manner to provide the first soft start power signal to the operating circuitry, the first soft start power signal having a first output voltage value that is between a voltage reference value of the voltage reference and a ground reference value of the ground reference,
   (ii) a first overvoltage protection switch interconnected between the first switched capacitor circuitry and the voltage reference, and
   (iii) a first control circuit coupled to the first switched capacitor circuitry and the first overvoltage protection switch, the first control circuit being configured to open the first overvoltage protection switch when the first output voltage value exceeds a first predetermined threshold; and
wherein the second converter includes:
   (i) second switched capacitor circuitry that electrically connects with the voltage reference and the ground reference in an alternating manner to provide the second soft start power signal to the operating circuitry, the second soft start power signal having a second output voltage value that is between the voltage reference value of the voltage reference and the ground reference value of the ground reference,
   (ii) a second overvoltage protection switch interconnected between the second switched capacitor circuitry and the voltage reference, and
   (iii) a second control circuit coupled to the second switched capacitor circuitry and the second overvoltage protection switch, the second control circuit being configured to open the second overvoltage protection switch when the second output voltage value exceeds a second predetermined threshold.

6. The circuit board of claim 1 wherein the first circuit further includes a control register, and wherein the first controller is further configured to selectively direct the first converter to provide (i) the first soft start power signal with a regulated voltage value regardless of a value of an input power signal when the control register stores a first control value, and (ii) the first soft start power signal with a margined voltage value based on the value of the input power signal when the control register stores a second control value that is different than the first control value.

7. A converter system, comprising:
   (a) a first circuit having:
      (i) a first converter that is configured to provide a first soft start power signal, and
      (ii) a first controller, coupled to the first converter, that is configured to provide a first control signal indicating whether the first converter properly provides the first soft start power signal;

(b) a second circuit having:
  (i) a second converter that is configured to provide a second soft start power signal, and
  (ii) a second controller, coupled to the second converter, that is configured to provide a second control signal indicating whether the second converter properly provides the second soft start power signal; and
(c) an interconnection mechanism which is configured to electrically connect the first controller of the first circuit with the second controller of the second circuit, wherein the first controller is configured to disable the first converter when the second control signal indicates that the second converter improperly provides the second soft start power signal, and wherein the second controller is configured to disable the second converter when the first control signal indicates that the first converter improperly provides the first soft start power signal.

8. The converter system of claim 7 wherein the interconnection mechanism is a conductive pathway, wherein the first controller includes (i) a first output circuit that electrically connects with the conductive pathway to provide the first control signal on the conductive pathway and (ii) a first sensor that electrically connects with the conductive pathway, and wherein the second controller includes (i) a second output circuit that electrically connects with the conductive pathway to provide the second control signal on the conductive pathway and (ii) a second sensor that electrically connects with the conductive pathway.

9. The converter system of claim 1 wherein the conductive pathway includes:
  a switch;
  a first conductor having a first end that electrically connects with the first output circuit and the first sensor, and a second end that electrically connects with the switch; and
  a second conductor having a first end that electrically connects with the second output circuit and the second sensor, and a second end that electrically connects with the switch.

10. The converter of claim 7 wherein the first controller is further configured to provide a first current indication signal which is proportional to a value of current of the first soft start power signal; wherein the second controller is further configured to provide a second current indication signal which is proportional to a value of current of the second soft start power signal; wherein the first controller is configured to direct the first converter to provide the first soft start power signal based on the second current indication signal provided by the second controller; and wherein the second controller is configured to direct the second converter to provide the second soft start power signal based on the first current indication signal provided by the first controller.

11. The converter system of claim 7 wherein the first converter includes:
  (i) first switched capacitor circuitry that electrically connects with a voltage reference and a ground reference in an alternating manner to provide the first soft start power signal to the operating circuitry, the first soft start power signal having a first output voltage value that is between a voltage reference value of the voltage reference and a ground reference value of the ground reference,
  (ii) a first overvoltage protection switch interconnected between the first switched capacitor circuitry and the voltage reference, and
  (iii) a first control circuit coupled to the first switched capacitor circuitry and the first overvoltage protection switch, the first control circuit being configured to open the first overvoltage protection switch when the first output voltage value exceeds a first predetermined threshold; and wherein the second converter includes:
  (i) second switched capacitor circuitry that electrically connects with the voltage reference and the ground reference in an alternating manner to provide the second soft start power signal to the operating circuitry, the second soft start power signal having a second output voltage value that is between the voltage reference value of the voltage reference and the ground reference value of the ground reference,
  (ii) a second overvoltage protection switch interconnected between the second switched capacitor circuitry and the voltage reference, and
  (iii) a second control circuit coupled to the second switched capacitor circuitry and the second overvoltage protection switch, the second control circuit being configured to open the second overvoltage protection switch when the second output voltage value exceeds a second predetermined threshold.

12. The converter system of claim 7 wherein the first circuit further includes a control register, and wherein the first controller is further configured to selectively direct the first converter to provide (i) the first soft start power signal with a regulated voltage value regardless of a value of an input power signal when the control register stores a first control value, and (ii) the first soft start power signal with a margined voltage value based on the value of the input power signal when the control register stores a second control value that is different than the first control value.

13. A method for providing a set of soft start power signals to operating circuitry mounted on a circuit board, the method comprising the steps of:
  enabling a first converter to provide a first soft start power signal to the operating circuitry and a second converter to provide a second soft start power signal to the operation circuitry;
  providing a first control signal that indicates whether the first converter properly provides the first soft start power signal;
  providing a second control signal that indicates whether the second converter properly provides the second soft start power signal; and
  disabling the first converter if the second control signal indicates that the second converter improperly provides the second soft start power signal, and disabling the second converter if the first control signal indicates that the first converter improperly provides the first soft start power signal.

14. The method of claim 13 wherein the step of providing the first control signal includes the step of applying the first control signal to a conductive pathway; wherein the step of providing the second control signal includes the step of applying the second control signal to the conductive pathway; and wherein the method further comprises the steps of:
  sensing the conductive pathway to determine whether either any of the first converter improperly provides the first soft start power signal and the second converter improperly provides the second soft start power signal.

15. The method of claim 14, further comprising the step of:
  providing a disconnection in the conductive pathway to prevent further disabling of the first converter if the second control signal indicates that the second converter improperly provides the second soft start power signal, and further disabling of the second converter if the first control signal indicates that the first converter improperly provides the first soft power signal.

16. The method of claim 13, further comprising the steps of:

providing a first current indication signal which is proportional to a value of current of the first soft start power signal;

providing a second current indication signal which is proportional to a value of current of the second soft start power signal; and directing the first converter to adjust the first soft power signal based on the second current indication signal provided by the second controller, and directing the second converter to adjust the second soft start power signal based on the first current indication signal provided by the first controller.

17. The method of claim 13 wherein the step of enabling includes the steps of:

electrically connecting a first power storage device with a voltage reference and a ground reference in an alternating manner to provide the first soft start power signal having a first output voltage value that is between a voltage reference value of the voltage reference and a ground reference value of the ground reference;

comparing the first output voltage value of the first soft start power signal to a first predetermined threshold;

opening a first overvoltage protection switch interconnected between the first power storage device and the voltage reference when the first output voltage value exceeds the first predetermined threshold;

electrically connecting a second power storage device with the voltage reference and the ground reference in an alternating manner to provide the second soft start power signal having a second output voltage value that is between the voltage reference value of the voltage reference and the ground reference value of the ground reference;

comparing the second output voltage value of the second soft start power signal to a second predetermined threshold; and opening a second overvoltage protection switch interconnected between the second power storage device and the voltage reference when the second output voltage value exceeds the second predetermined threshold.

18. The method of claim 13, further comprising the step of:

storing one of a first control value and a second control value that is different than the first control value in a control register; and wherein the step of enabling includes the step of:

providing the first soft power signal, the first soft start power signal having (i) a regulated voltage value regardless of a value of an input power signal when the control register stores the first control value, and (ii) a margined voltage value based on the value of the input power signal when the control register stores the second control value that is different than the first control value.

* * * * *

UNITED STATES PATENT AND TRADEMARK OFFICE
CERTIFICATE OF CORRECTION

PATENT NO. : 6,738,268 B1
DATED : May 18, 2004
INVENTOR(S) : David Sullivan and Robert MacArthur It is certified that error appears in the above-identified patent and that said Letters Patent is hereby corrected as shown below:

Title page,
Item [54], Title, "METHOD AND APPARATUS", should read -- METHODS AND APPARATUS --

Signed and Sealed this

Fifteenth Day of February, 2005

JON W. DUDAS
*Director of the United States Patent and Trademark Office*